US012162725B2

(12) United States Patent
Haag et al.

(10) Patent No.: US 12,162,725 B2
(45) Date of Patent: Dec. 10, 2024

(54) METHOD, AN ARRANGEMENT AND A TRANSPORT APPARATUS FOR TRANSPORTING ELEVATOR GUIDE RAILS IN A SHAFT

(71) Applicant: Kone Corporation, Helsinki (FI)

(72) Inventors: Mikael Haag, Helsinki (FI); Harri Makinen, Helsinki (FI); Joonas Jokela, Helsinki (FI); Markku Haivala, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/338,796

(22) Filed: Jun. 21, 2023

(65) Prior Publication Data

US 2023/0331519 A1 Oct. 19, 2023

Related U.S. Application Data

(63) Continuation of application No. PCT/EP2021/050838, filed on Jan. 15, 2021.

(51) Int. Cl.
*B66B 19/00* (2006.01)

(52) U.S. Cl.
CPC .................................. *B66B 19/002* (2013.01)

(58) Field of Classification Search
CPC ........ B66B 19/002; B66B 7/026; B66B 7/024
See application file for complete search history.

(56) References Cited

U.S. PATENT DOCUMENTS

| | | | | |
|---|---|---|---|---|
| 6,991,070 | B1 * | 1/2006 | Sanz Gamboa | B66B 7/02 187/408 |
| 7,444,732 | B2 * | 11/2008 | Cruz | B66B 19/002 187/408 |
| 9,381,770 | B2 * | 7/2016 | Björni | B66B 7/026 |
| 9,592,997 | B2 * | 3/2017 | Mertala | B66B 19/002 |
| 9,714,156 | B2 * | 7/2017 | Valkama | B66B 5/0087 |
| 9,751,728 | B2 * | 9/2017 | Mertala | E04G 3/246 |
| 10,723,591 | B2 * | 7/2020 | Kirsch | B66B 7/024 |
| 11,358,834 | B2 * | 6/2022 | Haag | B66B 7/026 |

(Continued)

FOREIGN PATENT DOCUMENTS

JP 3212807 B2 9/2001

OTHER PUBLICATIONS

International Search Report PCT/ISA/210 and Written Opinion PCT/ISA/237 for International Application No. PCT/EP2021/050838 on Oct. 11, 2021.

*Primary Examiner* — Michael A Riegelman
(74) *Attorney, Agent, or Firm* — Harness, Dickey & Pierce, P.L.C.

(57) ABSTRACT

A method, arrangement and transport apparatus for transporting elevator guide rails in a shaft, the transport apparatus including a hook device connected to a first hoist and a lever device connected to the hook device. The lever device is movably supported on guide rails. The lever device includes a holding device being movably supported in the lever device. The holding device is linearly movable between a transport position and a mounting position. A new guide rail element is connected to the hook device and the holding device and transported to the installation position. The holding device is moved to the mounting position, and the new guide rail element is connected to the row of already installed guide rail elements.

16 Claims, 10 Drawing Sheets

(56) References Cited

U.S. PATENT DOCUMENTS

Figure 1:
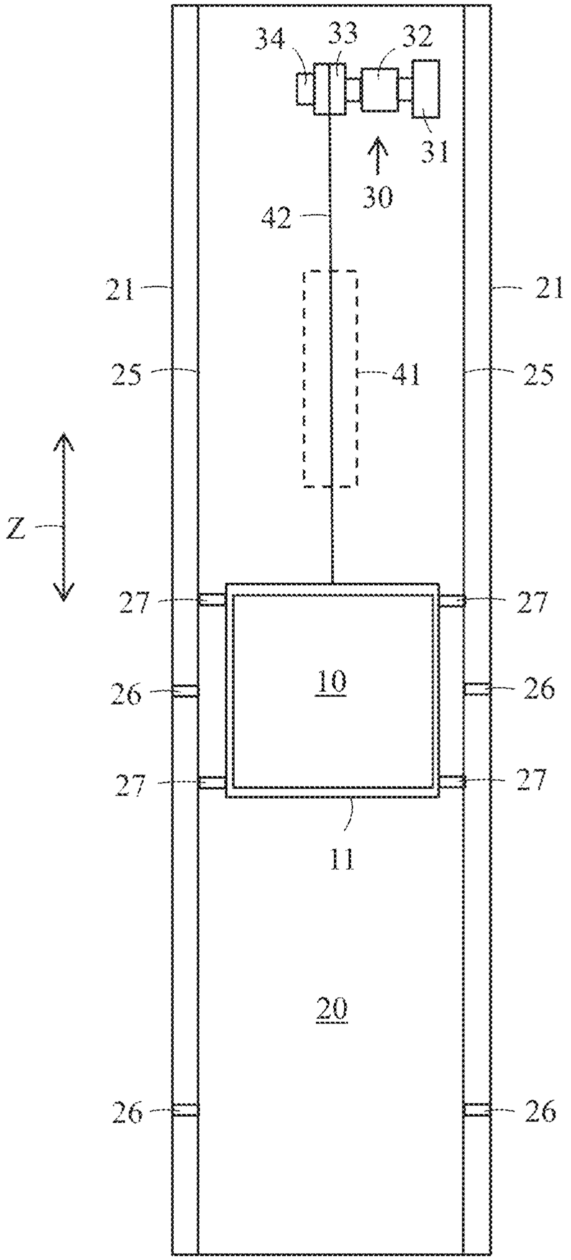

| | | | | |
|---|---|---|---|---|
| 11,365,095 | B2 * | 6/2022 | Haag | B66B 19/002 |
| 11,530,114 | B2 * | 12/2022 | Haag | B66B 7/024 |
| 2009/0223751 | A1 * | 9/2009 | Peacock | B66B 19/00 187/414 |
| 2010/0133048 | A1 * | 6/2010 | Barneman | B66B 19/00 187/414 |
| 2012/0263554 | A1 * | 10/2012 | Sanz Gamboa | B66B 7/026 411/81 |
| 2013/0056310 | A1 * | 3/2013 | Bjorni | B66B 7/02 187/408 |
| 2015/0314993 | A1 * | 11/2015 | Bolme | B66B 19/00 52/741.1 |
| 2016/0060078 | A1 * | 3/2016 | Mertala | B66B 19/002 52/741.1 |
| 2016/0083222 | A1 * | 3/2016 | Fernandez | B66B 7/026 29/446 |
| 2016/0311659 | A1 * | 10/2016 | Mertala | E04G 3/246 |
| 2018/0009633 | A1 * | 1/2018 | Fargo | B66B 7/022 |
| 2018/0079624 | A1 * | 3/2018 | Kirsch | B66B 11/0407 |
| 2018/0170712 | A1 * | 6/2018 | Fauconnet | B66B 7/026 |
| 2018/0297815 | A1 * | 10/2018 | Kirsch | B66B 19/002 |
| 2019/0055108 | A1 * | 2/2019 | Fauconnet | B33Y 80/00 |
| 2021/0016994 | A1 * | 1/2021 | Haag | B66B 7/026 |
| 2021/0016996 | A1 * | 1/2021 | Makinen | B66B 7/023 |
| 2021/0016997 | A1 * | 1/2021 | Haag | B66B 19/002 |
| 2021/0016998 | A1 * | 1/2021 | Haag | B66B 7/024 |
| 2021/0245998 | A1 * | 8/2021 | Lanz | B66B 19/00 |
| 2023/0331519 | A1 * | 10/2023 | Haag | B66B 19/002 |
| 2023/0331520 | A1 * | 10/2023 | Haag | B66B 19/002 |
| 2024/0083715 | A1 * | 3/2024 | Makinen | B66B 19/002 |
| 2024/0083716 | A1 * | 3/2024 | Makinen | B66B 19/002 |

* cited by examiner

METHOD, AN ARRANGEMENT AND A TRANSPORT APPARATUS FOR TRANSPORTING ELEVATOR GUIDE RAILS IN A SHAFT

CROSS-REFERENCE TO RELATED APPLICATION

This application is a continuation of PCT International Application No. PCT/EP2021/050838 which has an International filing date of Jan. 15, 2021, the entire contents of which are incorporated herein by reference.

FIELD

The invention relates to a method, an arrangement and a transport apparatus for transporting elevator guide rails in a shaft.

BACKGROUND

An elevator may comprise a car, a shaft, hoisting machinery, ropes, and a counterweight. A separate or an integrated car frame may surround the car.

The hoisting machinery may be positioned in the shaft. The hoisting machinery may comprise a drive, an electric motor, a traction sheave, and a machinery brake. The hoisting machinery may move the car upwards and downwards in the shaft. The machinery brake may stop the rotation of the traction sheave and thereby the movement of the elevator car.

The car frame may be connected by the ropes via the traction sheave to the counterweight. The car frame may further be supported with guiding means at guide rails extending in the vertical direction in the shaft. The guide rails may be attached with fastening brackets to the side wall structures in the shaft. The guiding means keep the car in position in the horizontal plane when the car moves upwards and downwards in the shaft. The counterweight may be supported in a corresponding way on guide rails that are attached to the wall structure of the shaft.

The car may transport people and/or goods between the landings in the building. The wall structure of the shaft may be formed of solid walls or of an open beam structure or of any combination of these.

The guide rails may be formed of guide rail elements of a certain length. The guide rail elements may be connected in the installation phase end-on-end one after the other in the elevator shaft. One possibility to attach the guide rail elements to each other is to use connection plates extending between the end portions of two consecutive guide rail elements. The connection plates may be attached to the consecutive guide rail elements. The ends of the guide rails may comprise form locking means in order to position the guide rails correctly in relation to each other. Another possibility to attach the guide rail elements to each other is to use jointing clamps attached to the opposite ends of the guide rail elements. The jointing clamps may comprise male and female attachment means for attaching to the jointing clamps and thereby also the guide rails to each other.

The guide rails may be attached to the walls of the elevator shaft with brackets along the height of the guide rails.

The transport of the guide rails in the shaft during the installation of the guide rails is a labour-intensive task involving risks. The problems are even more profound in modern high-rise buildings.

SUMMARY

An object of the invention is an improved method, an arrangement and a transport apparatus for transporting elevator guide rails in a shaft.

The method for transporting elevator guide rails in a shaft according to the invention is defined in claim 1.

The arrangement for transporting elevator guide rails in a shaft according to the invention is defined in claim 8.

The transport apparatus for transporting elevator guide rails in a shaft according to the invention is defined in claim 15.

The guide rail elements are transported in the shaft with a transport apparatus connected to a first hoist. The transport apparatus comprises a hook device and a lever device. The lever device comprises a frame and a holding device movably supported on the frame. A guide rail element to be lifted may be attached to the transport apparatus so that an upper end of the guide rail element to be lifted is attached to the hook device and a lower end of the guide rail element to be lifted is supported on the holding device in the lever device. The lever device may be movably supported on a row of already installed guide rail elements.

The invention discloses a simple and cost-efficient solution for transporting elevator guide rails in a shaft.

The invention may speed up the transport of elevator guide rails in the shaft.

A new guide rail element may be lifted in a controlled manner with the transport apparatus. The guide rail element is supported on the transport apparatus and the transport apparatus is movably supported on the row of already installed guide rail elements during the lifting of the guide rail element. Swinging of the guide rail element is thus eliminated during the lifting of the guide rail element.

The lowering of the transport apparatus in the shaft during the fetch of a new guide rail element is also done in a controlled manner. The lever device may also, when moving downwards, be movably supported on the row of already installed guide rail elements. The hook device may also be movably supported on the row of already installed guide rail elements when moving downwards, but this is not necessary. The lever device is connected to the hook device and excessive swinging of the hook device when moving downwards is thus prevented.

The upper end of the guide rail element may be fixedly attached to the hook device during the lifting of the guide rail element. The attachment may be arranged via a jointing clamp attached to the upper end of the guide rail element or via a connection plate attached to the upper end of the guide rail element.

The arrangement in which the lever device comprises a movable holding device forms an advantageous solution for transporting the guide rail element. The guide rail element to be installed may be transported upwards in the shaft with the transport apparatus so that the guide rail element is in a transport position during the transport. The guide rail element to be lifted is in the transport position located at a distance from the row of already installed guide rail elements. The guide rail element to be lifted may be moved with the holding device to a mounting position when the lever device has reached the upper end of the row of already installed guide rail elements. The guide rail element to be installed is in the mounting position located above the upper end of the row of already installed guide rail elements. The lower end of the guide rail element to be installed may thus in the mounting position be connected to the upper end of the row of already installed guide rail elements.

The holding device may be moved by an actuator. The holding device may move linearly in the horizontal plane in the lever device. The actuator may be formed by a weight. The weight may be arranged to be movable in the vertical direction in the lever device. The weight moving in the vertical direction in the lever device moves the holding device in the horizontal direction between the transport position and the mounting position in the lever device A linear movement of the holding device does not cause any bending torque on the lever device. A bending torque could in a worst case cause the lever device to be detached from the guide rail.

An installation platform operated by a second hoist may be used when installing the guide rail element after the guide rail element has been lifted to the installation position in the shaft. The guide rail element may be connected to the upper end of the row of already installed guide rail elements and attached to a wall in the shaft from the installation platform. This may be done manually by a technician or automatically by a robot from the installation platform.

DRAWINGS

Figure 2:
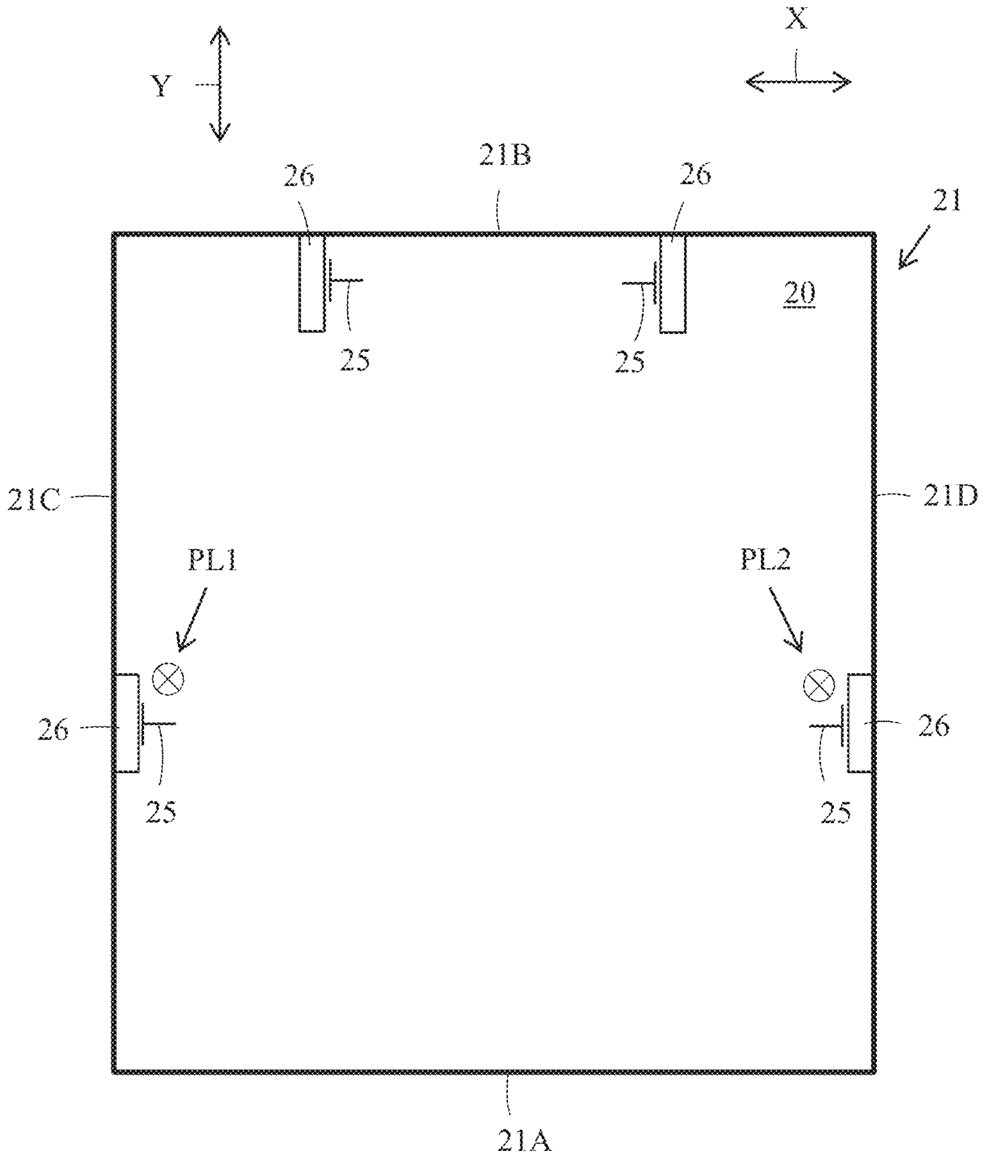
Figure 3:
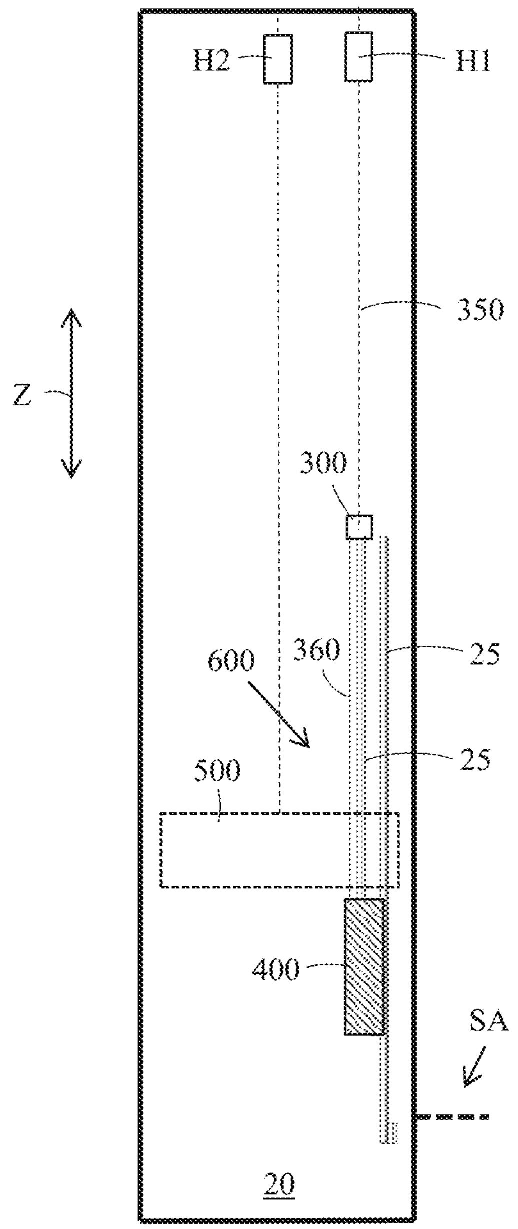
Figure 4:
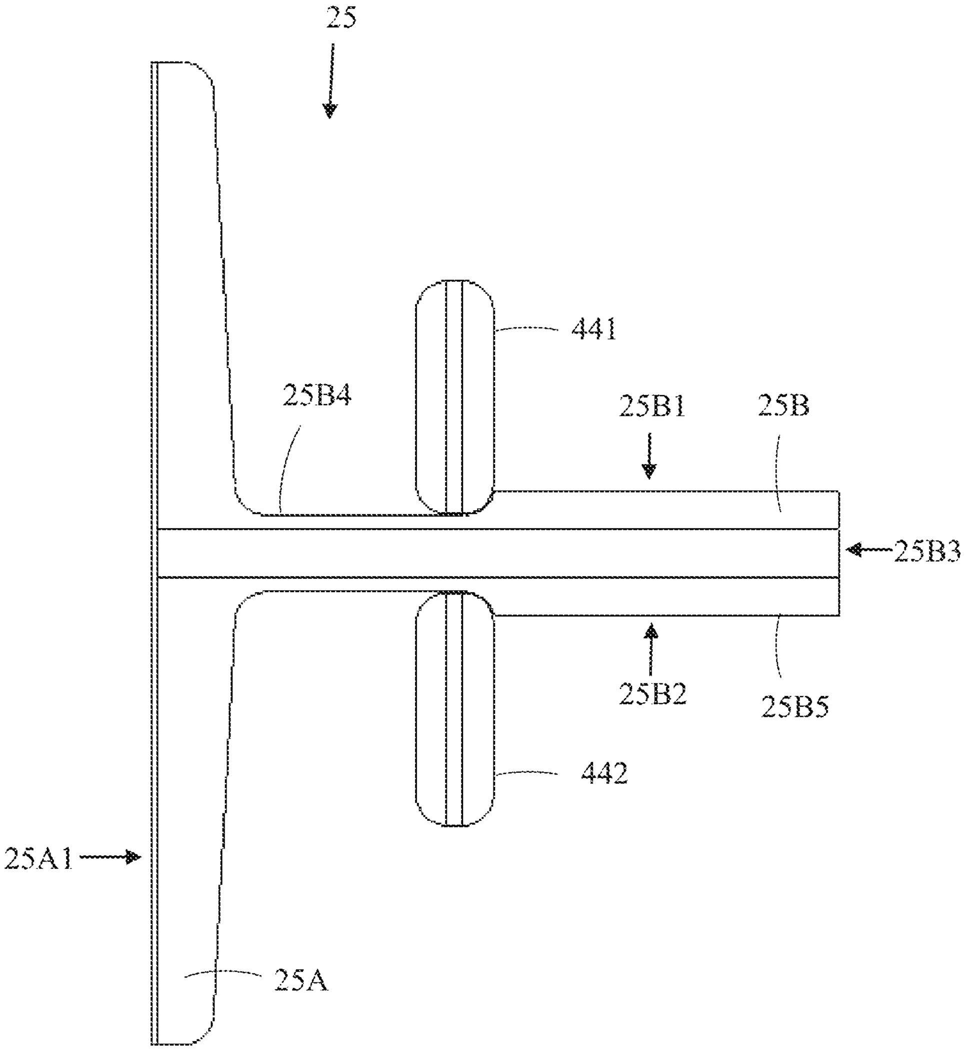
Figure 5:
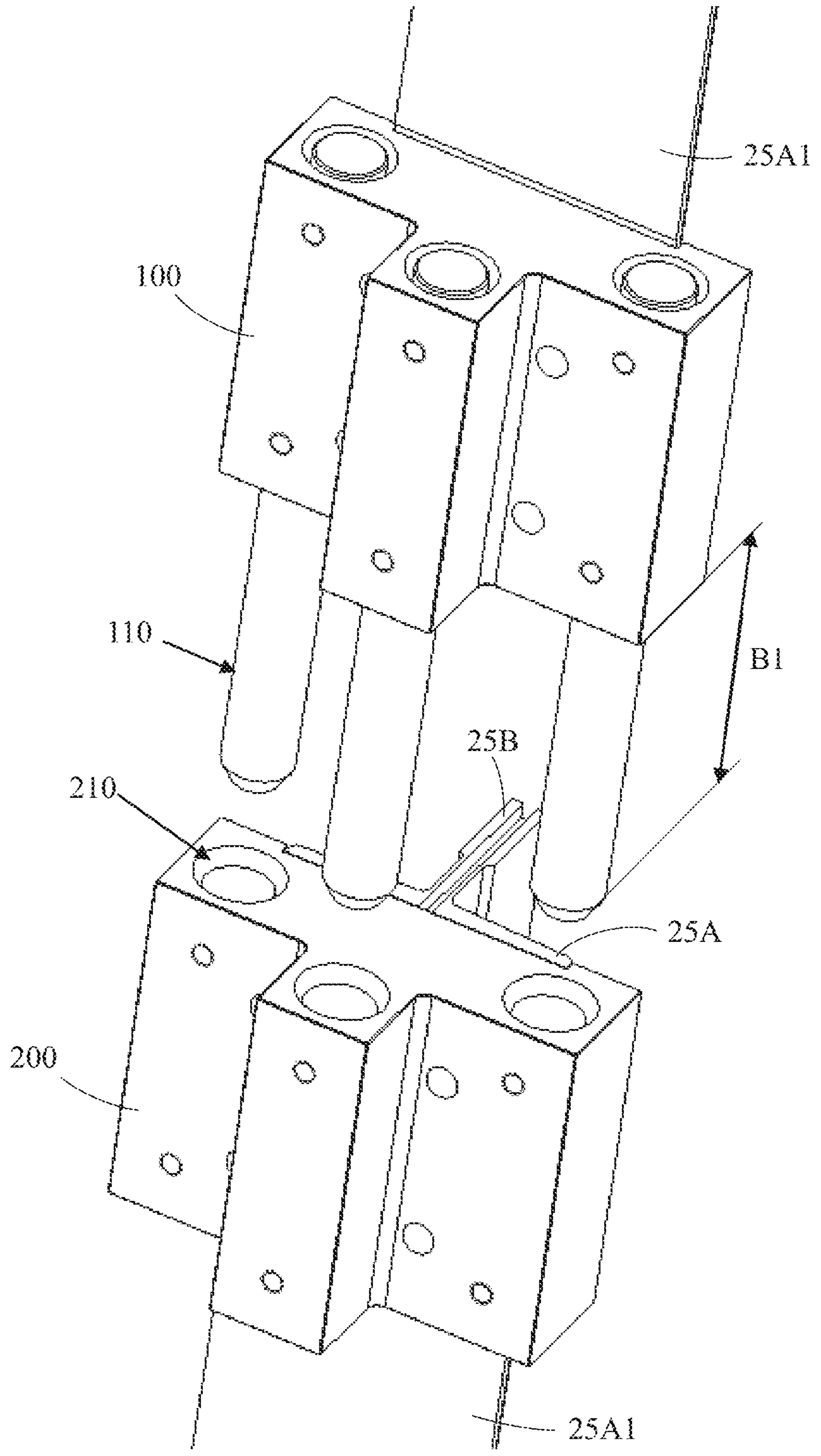
Figure 6:
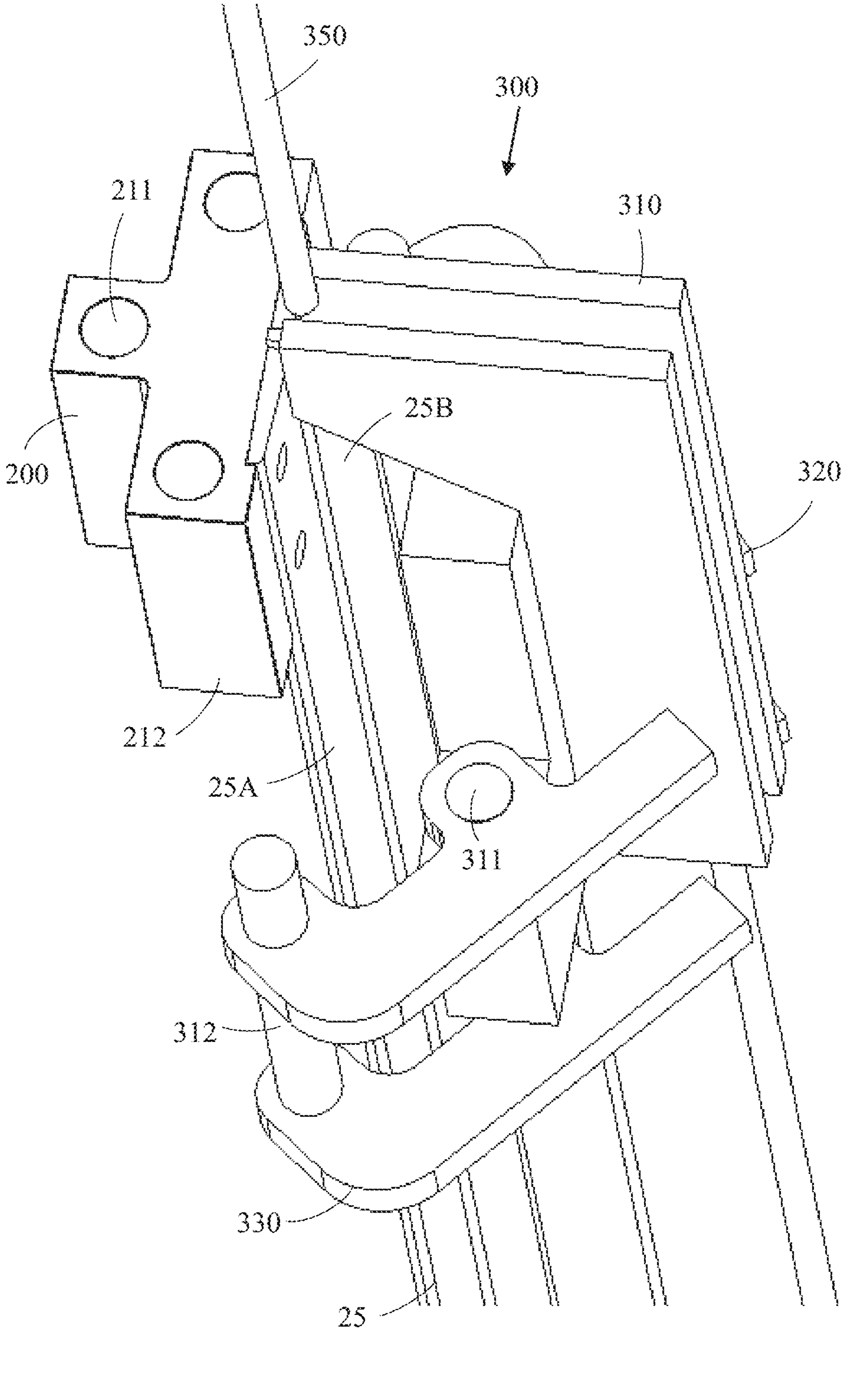
Figure 7:
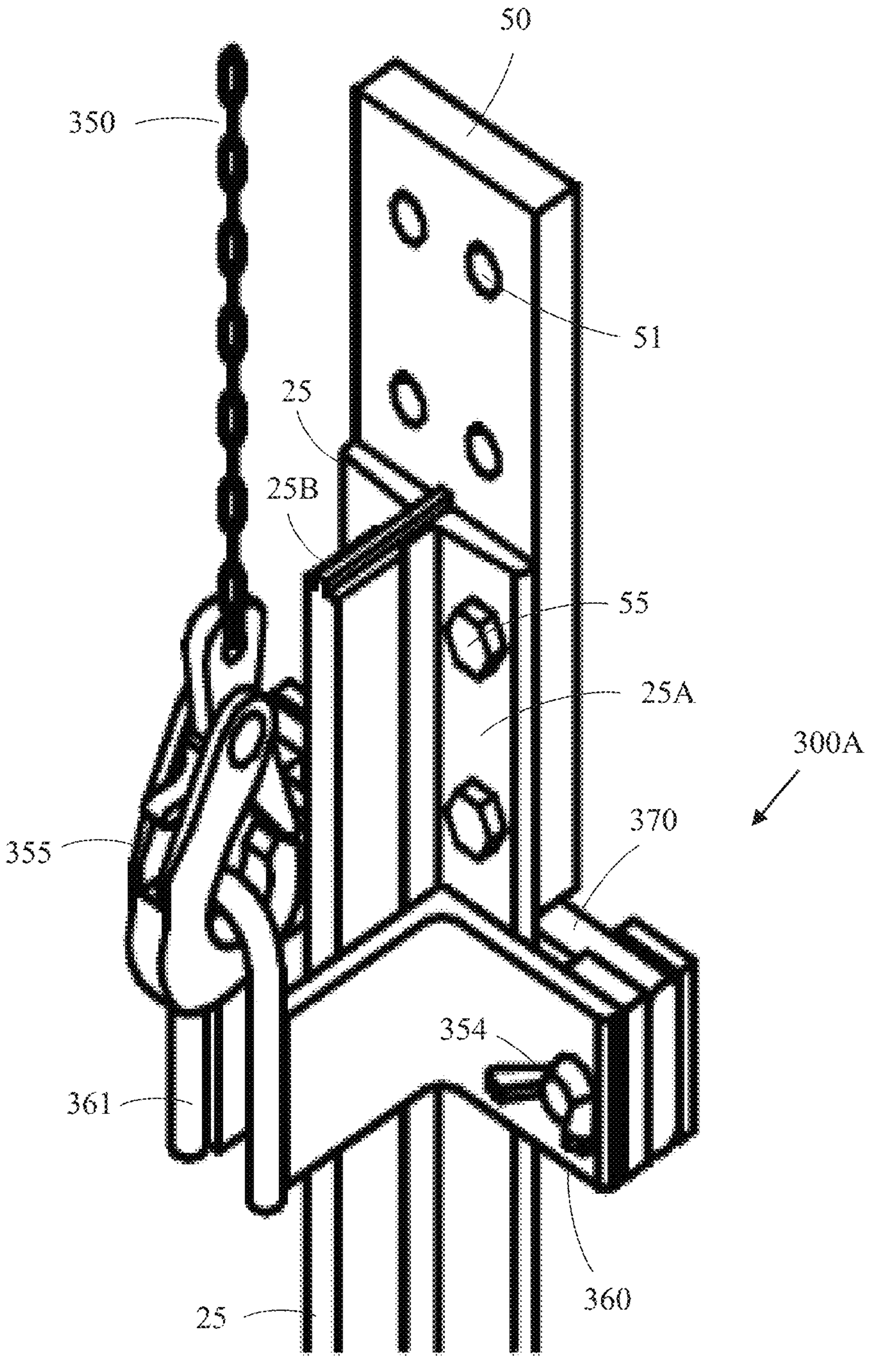
Figure 8:
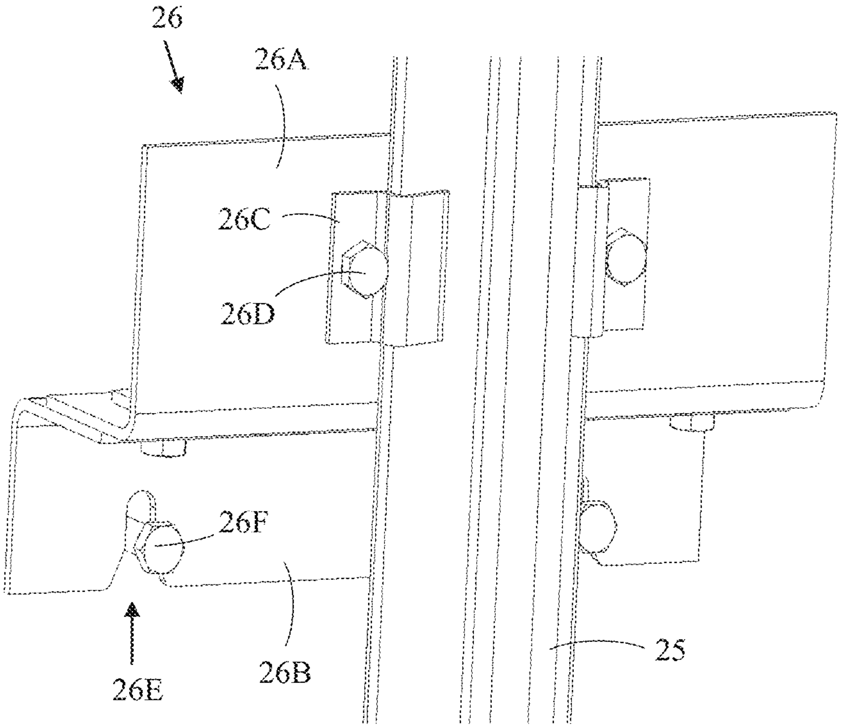
Figure 9:
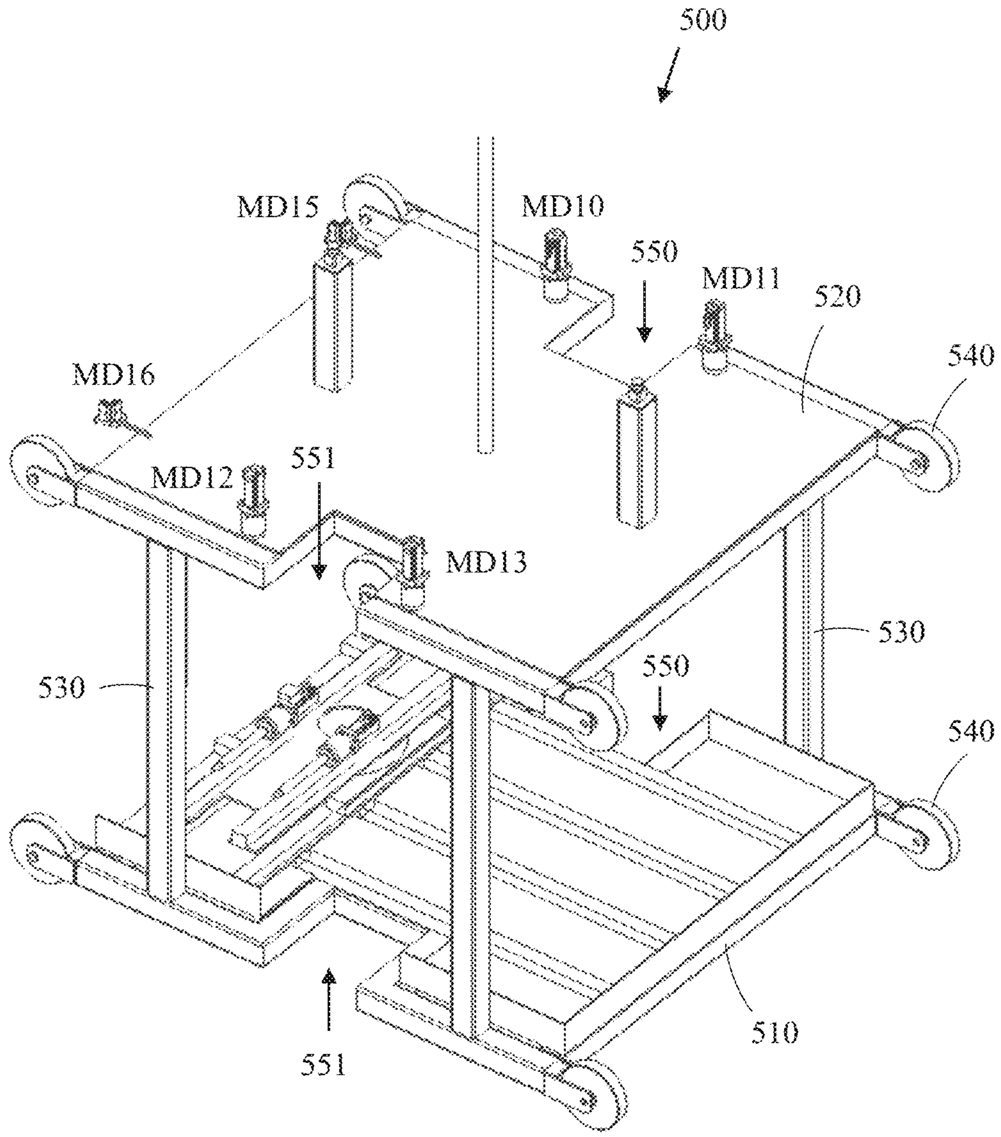
Figure 10:
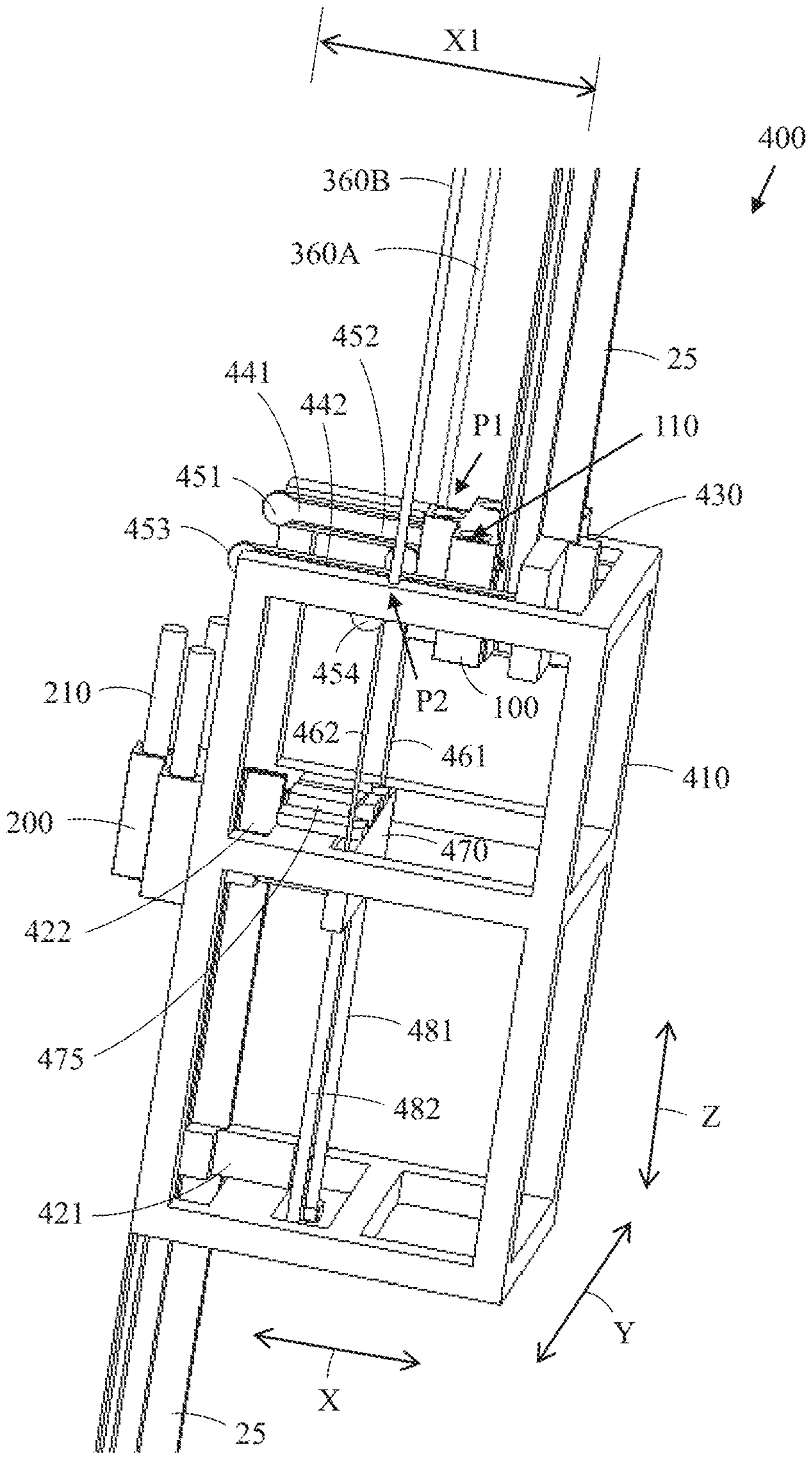

The invention will in the following be described in greater detail by means of preferred embodiments with reference to the attached drawings, in which FIG. 1 shows a side view of an elevator, FIG. 2 shows a horizontal cross section of the elevator, FIG. 3 shows an arrangement for installing guide rails, FIG. 4 shows a cross-section of a guide rail, FIG. 5 shows an arrangement for joining guide rails, FIG. 6 shows a first embodiment of a hook device of a transport apparatus, FIG. 7 shows a second embodiment of a hook device of a transport apparatus, FIG. 8 shows a bracket, FIG. 9 shows an installation platform, FIG. 10 shows a lever device of a transport apparatus.

DETAILED DESCRIPTION

FIG. 1 shows a side view and FIG. 2 shows a horizontal cross section of the elevator.

The elevator may comprise a car 10, an elevator shaft 20, hoisting machinery 30, ropes 42, and a counterweight 41. A separate or an integrated car frame 11 may surround the car 10.

The hoisting machinery 30 may be positioned in the shaft 20. The hoisting machinery may comprise a drive 31, an electric motor 32, a traction sheave 33, and a machinery brake 34. The hoisting machinery 30 may move the car 10 in a vertical direction Z upwards and downwards in the vertically extending elevator shaft 20. The machinery brake 34 may stop the rotation of the traction sheave 33 and thereby the movement of the elevator car 10.

The car frame 11 may be connected by the ropes 42 via the traction sheave 33 to the counterweight 41. The car frame 11 may further be supported with guiding means 27 at guide rails 25 extending in the vertical direction in the shaft 20. The guiding means 27 may comprise rolls rolling on the guide rails 25 or gliding shoes gliding on the guide rails 25 when the car 10 is moving upwards and downwards in the elevator shaft 20. The guide rails 25 may be attached with fastening brackets 26 to the side wall structures 21 in the elevator shaft 20. The guiding means 27 keep the car 10 in position in the horizontal plane when the car 10 moves upwards and downwards in the elevator shaft 20. The counterweight 41 may be supported in a corresponding way on guide rails that are attached to the wall structure 21 of the shaft 20.

The wall structure 21 of the shaft 20 may be formed of solid walls 21 or of an open beam structure or of any combination of these. One or more of the walls may thus be solid and one or more of the walls may be formed of an open beam structure. The shaft 20 may be comprise a front wall 21A, a back wall 21B and two opposite side walls 21C, 21D. There may be two guide rails 25 for the car 10. The two car guide rails 25 may be positioned on opposite side walls 21C, 21D. There may further be two guide rails 25 for the counterweight 41. The two counterweight guide rails 25 may be positioned on the back wall 21B.

The guide rails 25 may extend vertically along the height of the elevator shaft 20. The guide rails 25 may thus be formed of guide rail elements of a certain length e.g. 5 m. The guide rail elements 25 may be installed end-on-end one after the other. The guide rail elements 25 may be attached to each other with connection plates extending between the end portions of two consecutive guide rail elements 25. The connection plates may be attached to the consecutive guide rail elements 25. The ends of the guide rails 25 may comprise locking means for positioning the guide rails 25 correctly in relation to each other. The guide rails 25 may be attached to the walls 21 of the elevator shaft 20 with support means at support points along the height of the guide rails 25.

The car 10 may transport people and/or goods between the landings in the building.

FIG. 2 shows plumb lines PL1, PL2 in the shaft 20, which may be produced by plumbing of the shaft 20 at the beginning of the installation of the elevator. The plumb lines PL1, PL2 may be formed with traditional vires or with light sources e.g. lasers having the beams directed upwards along the plumb lines PL1, PL2. One plumb line and a gyroscope or two plumb lines are normally needed for a global measurement reference in the shaft 20.

FIG. 1 shows a first direction Z, which is a vertical direction in the elevator shaft 20. FIG. 2 shows a second direction X, which is the direction between the guide rails (DBG) and a third direction Y, which is the direction from the back wall to the front wall (BTF) in the shaft 20. The second direction X is perpendicular to the third direction Y. The second direction X and the third direction Y are perpendicular to the first direction Z.

FIG. 3 shows an arrangement for installing guide rails.

A first hoist H1 may be arranged in the shaft 20 for moving a transport apparatus 600 upwards and downwards in the shaft 20. The first hoist H1 may be suspended from the ceiling of the shaft 20.

A second hoist H2 may be arranged in the shaft 20 for moving an installation platform 500 upwards and downwards in the shaft 20. The second hoist H2 may be suspended from the ceiling of the shaft 20.

The installation platform 500 may be supported with rolls on opposite solid walls 21 in the shaft 20. A connection between the installation platform 500 and the guide rails 25 is thus not needed. The installation platform 500 may be used to transport one or more technicians and/or one or more robots and/or tools in the shaft 20. A horizontal cross-section of the installation platform 500 may be provided with passages for the guide rails 25. The installation platform 500 may be used for scanning the shaft 20 before the elevator installation and/or for installing the guide rails to the wall 21 of the shaft 20 and/or for aligning the guide rails 25 after the elevator installation.

A storage area SA may be arranged in the shaft or on a landing outside the shaft 20. The storage area SA could be arranged at any position below the working level of the guide rail installation. The storage area SA could first be positioned at a bottom position of the shaft and then later relocated to a higher position of the shaft as the installation advances. The guide rail elements 25 may be stored on the storage area SA and lifted with the transport apparatus 600. The guide rail elements 25 may be loaded manually on the transport apparatus 600. The storage area SA may form a loading position for the arrangement.

A first lowermost section of guide rails 25 may first be installed into the shaft 20 manually. The installation platform 500 may be used in the manual installation of the first section of guide rails 25 to the shaft 20.

A guide rail 25 may be lifted upwards in the shaft 20 with the transport apparatus 600 connected to the first hoist H1. The transport apparatus 600 may comprise a hook device 300 connected to the first hoist H1 and a lever device 400 connected to the hook device 300. The hook device 300 may be connected via a first wire 350 to the first hoist H1. The lever device 400 may be connected via a second wire 360 to the hook device 300. The lever device 400 could on the other hand be connected via a chain or a bar provided with articulated joints to the hook device 300. The articulated joints may be distributed along the length of the bar.

An upper end of the guide rail element 25 to be lifted may be attached to the hook device 300 and thereby to the first hoist H1.

A lower end of the guide rail element 25 to be lifted may be attached to the lever device 400. The lever device 400 may be movably supported on the row of already installed guide rail elements 25.

The guide rail element 25 may thus be lifted with the first hoist H1 and the transport apparatus 600 along the row of already installed guide rail elements 25. The upper end of the guide rail element 25 may be firmly attached to the hook device 300. The lifting force is thus transferred from the first hoist H1 to the hook device 300 and further to the guide rail element 25. The lower end of the guide rail element 25 may be attached to the lever device 400. The lever device 400 may move on the row of already installed guide rail elements 25. The lever device 400 may be supported with guide means e.g. rollers or guide shoes on the row of already installed guide rail elements 25.

The guide rail element 25 may be lifted along the row of already installed guide rail elements 25 to a height in which the lever device 400 reaches the upper end of the row of already installed guide rail elements 25.

The lower end of the guide rail element 25 may now be disconnected from the lever device 400. The lower end of the guide rail element 25 may thereafter be attached with a connection plate or with jointing clamps to the uppermost end of the row of already installed guide rails 25. This phase in the installation may be done from the installation platform 500 movable with the second hoist H2.

The guide rail element 25 may thereafter be attached with brackets to the wall 21 of the shaft 20. The hook device 300 may thereafter be disconnected from the guide rail element 25. This phase in the installation may also be done from the installation platform 500 movable with the second hoist H2.

The transport apparatus 600 i.e. the hook device 300 and the lever device 400 may thereafter be connected to the row of already installed guide rail elements 25. The transport apparatus 600 may thereafter be moved downwards along the row of already installed guide rail elements 25 with the first hoist H1. The hook device 300 and the lever device 400 may be movably supported on the row of already installed guide rail elements 25 when moving downwards. The hook device 300 and the lever device 400 may be supported with guiding means e.g. rollers or glide shoes on the row of already installed guide rail elements 25.

The installation work from the installation platform 500 may be done manually by one or more technicians and hand tools and/or automatically with one or more robots.

FIG. 4 shows a cross-section of a guide rail.

A cross-section of the guide rail element 25 may have the form of a letter T having a flat bottom portion 25A and a flat support portion 25B. The support portion 25B may protrude outwards from the middle of the bottom portion 25A. The bottom portion 25A may comprise a flat bottom surface 25A1. The flat bottom surface 25A1 is on the opposite side of the bottom portion 25A in relation to the support portion 25B. The guide rail element 25 may be attached with brackets to a wall 21 in the shaft 20 from the bottom portion 25A of the guide rail element 25. The support portion 25B of the guide rail element 25 may form two opposite side support surfaces 25B1, 25B2 and one front support surface 25B3 for the support shoes of the car 10 or the counterweight 41. The support shoes may be provided with gliding surfaces or rollers acting on the support surfaces 25B1, 25B2, 25B3 of the support portion 25B of the guide rail element 25.

The lever device 400 may be provided with rollers 441, 442 or gliding shoes rolling or gliding on the inner thinner portion 25B4 of the support portion 25B of the guide rail 25. The rollers 441, 442 or gliding shoes may be positioned in the transition between the lower thinner portion 25B4 and the outer thicker portion 25B5 of the support portion 25B of the guide rail 25. The lever device 400 may further comprise rollers acting on the front support surface 25B3 of the guide rail 25. The lever device 400 may be movably supported with the rollers 441, 442 on the row of already installed guide rail elements 25. The lever device 400 may thus be secured to the guide rail 25 during the upwards and downwards movement on the guide rail 25. The lower end of the guide rail element 25 is secured to the lever device 400 and the lever device 400 is secured to the guide rail 25 during the upwards movement of the transport apparatus 600 on the guide rail 25.

The rollers 441, 442 acting on the side support surfaces 25B1, 25B2 of the guide rail 25 may be movably supported in the lever device 400. The rollers 441, 442 may be moved between a first position in which the rollers 441, 442 are in contact with the guide rail 25 as seen in the figure and a second position in which the rollers 441, 442 are out of contact from the guide rail 25. The lever device 400 may be disconnected from the guide rail 25 when the rollers 441, 442 are in the second position.

Similar rollers 441, 442 may also be used in connection with the first embodiment of the hook device 300. The hook device 300 could be movably supported on the guide rail 25 with rollers. The hook device 300 could thus move downwards on the row of already installed guide rail elements 25, when the transport apparatus 600 is moved downwards in order to fetch a new guide rail element 25.

FIG. 5 shows an arrangement for joining guide rails.

The figure shows a lower end portion of an upper guide rail element 25 and an upper end portion of a lower guide rail element 25. The two guide rail elements 25 are to be joined end-to-end to each other.

The guide rail element 25 may correspond to the guide rail element shown in FIG. 4. The guide rail element 25 may thus comprise a flat bottom portion 25A and a flat support portion 25B protruding outwardly from the middle of the bottom portion 25A. The bottom portion 25A may comprise a flat bottom surface 25A1. The guide rail element 25 may be attached with brackets to a wall 21 in the shaft 20 from the bottom portion 25A of the guide rail element 25. The support portion 25B of the guide rail element 25 may form two opposite side support surfaces 25B1, 25B2 and one front support surface 25B3 for the guiding means of the car 10 or the counterweight 41. The guiding means may be formed of support shoes. The support shoes may be provided with gliding surfaces or rollers acting on the support surfaces 25B1, 25B2, 25B3 of the support portion 25B of the guide rail element 25.

Each guide rail element 25 may be provided with a first jointing clamp 100 attached to a first end of the guide rail element 25 and a second jointing clamp 200 attached to a second opposite end of the guide rail element 25. The jointing clamps 100, 200 may be attached to the bottom surface 25A1 of the bottom portion 25A of the guide rail element 25. The first end of the guide rail element 25 may be the lower end of the guide rail element 25 and the second end of the guide rail element 25 may be the upper end of the guide rail element 25. The figure shows the first jointing clamp 100 on the lower end of the upper guide rail element 25 and the second jointing clamp 200 on the upper end of the lower guide rail element 25.

Each guide rail element 25 may be provided with transverse through holes in the bottom portion 25A of the guide rail element 25 at each end of the guide rail element 25. The first jointing clamp 100 and the second jointing clamp 200 may on the other hand be provided with corresponding threaded holes. Bolts may pass through the holes in the bottom portion 25A of the guide rail element 25 into the threaded holes in the first and the second jointing clamp 100, 200 in order to attach the first and the second jointing clamp 100, 200 to the respective end of the guide rail element 25. The jointing clamps 100, 200 are thus positioned on the bottom surface 25A1 of the bottom part 25A. The bottom surface 25A1 is the opposite surface of the bottom portion 25A in relation to the surface of the bottom portion 25A from which the support portion 25B extends outwards. The jointing clamps 100, 200 are thus facing towards a wall 21 in the shaft 20.

A first outer end of the first jointing clamp 100 may be substantially flush with the lower end of the guide rail element 25. The first jointing clamp 100 may comprise male joint elements 110 extending outwards in a longitudinal direction from the first end of the first jointing clamp 100. The longitudinal direction may coincide with the longitudinal direction of the guide rail element 25. The male joint elements 110 may be adapted to pass into corresponding female joint elements 210 in the second jointing clamp 200. The male joint elements 110 may have an equal axial length B1. The axial length B1 of the male joint elements 110 could on the other hand be staggered. The benefit of using male joint elements 110 with a staggered axial length B1 would be to be able to guide the first jointing clamp 100 and the second jointing clamp 200 into a correct position in relation to each other in one direction at a time. The first jointing clamp 100 and the second jointing clamp 200 may be pre-set into correct positions on the guide rail elements 25 before the installation in the shaft 20. The pre-setting is beneficial when using male joint elements 110 with an equal axial length B1.

The male joint elements 110 may be formed of pins. A transverse cross-section of the pins may be circular. The female joint elements 210 may be formed of holes. A transverse cross-section of holes corresponds to the transverse cross-section of the pins.

The number of male joint elements 110 as well as the number of female joint elements 210 is three in this embodiment, but there could be any number of male joint elements 110 in the first jointing clamp 100 and a corresponding number of female joint elements 210 in the second jointing clamp 200. There may thus be at least one male joint element 110 in the first jointing clamp 100 and at least one female joint element 210 in the second jointing clamp 200. The three mail joint elements 110 and the three female joint elements 210 may be positioned in the corners of a triangle.

The number of male joint elements 110 in the first jointing clamp 100 and the number of female joint elements 210 in the second jointing clamp 200 may be equal.

The first jointing clamp 100 and the second jointing clamp 200 may form a plug-in joint between two consecutive guide rail elements 25.

The first jointing clamp 100 may be produced so that through holes are bored in the longitudinal direction of the first jointing clamp 100. The male joint elements 110 are then inserted into the holes and attached in the holes with a pressure joint. There will thus remain blind bored holes extending into the first jointing clamp 100 from the second inner end of the first jointing clamp 100.

A first outer end of the second jointing clamp 200 may be substantially flush with the upper end of the guide rail element 25. The second jointing clamp 200 may comprise holes 210 passing in a longitudinal direction into the second jointing clamp 200 from the first end of the second jointing clamp 200. The longitudinal direction may coincide with the longitudinal direction of the guide rail element 25. The holes 210 may be through holes passing through the second jointing clamp 200.

The two consecutive guide rail elements 25 will be in a correct position in relation to each other when the pins 110 of the first jointing clamp 100 have been pushed fully into the holes 210 of the second jointing clamp 200. The first end surface of the first jointing clamp 100 and the first end surface of the second jointing clamp 200 are then positioned against each other. The opposite surfaces of the two consecutive guide rail elements 25 are also positioned against each other in this position.

The weight of the one or more upper guide rail element 25 will keep the first jointing clamp 100 and the second jointing clamp 200 together. The guide rail elements 25 will naturally also be attached to the wall 21 of the shaft 20 with brackets, whereby movement of the guide rail elements 25 in any direction is eliminated. There is thus probably no need for a separate locking between the first jointing clamp 100 and the second jointing clamp 200. It is naturally possible to provide a separate locking between the first jointing clamp 100 and the second jointing clamp 200 if needed. The locking could be realized as a snap locking between the first jointing clamp 100 and the second jointing clamp 200.

Another possibility would be to provide e.g. the outer end of the middlemost pin 110 with a threading. The middlemost pin 110 could be made long enough so that the outer end of the pin would protrude out from the opposite end of the second jointing clamp 200, when the first jointing clamp 100 and the second jointing clamp 200 are joined together. A nut could then be screwed on the threading in the middlemost pin 110 in order to lock the two jointing clamps 100, 200 together.

The opposite end surfaces of two consecutive guide rail elements 25 may further be provided with a form locking.

One end surface could be provided with a groove and the opposite end surface could be provided with a protrusion seating into the groove.

The first jointing clamp 100 and the second jointing clamp 200 may be made of cast iron or of aluminium.

The pins 110 in the first jointing clamp 100 may be made of cold drawn steel bars. The pins 110 could on the other hand also be made of plastic.

The outer ends of the pins 110 in the first jointing clamp 100 may be chamfered in order to facilitate the alignment of the pins 110 into the holes 210 in the second jointing clamp 200.

FIG. 6 shows a first embodiment of a hook device of a transport apparatus.

The hook device 300 may comprise a body portion 310 and two locking members 320, 330 pivotably attached to the body portion 310. Each locking member 320, 330 may comprise two parallel rocker arms at a distance from each other. The rocker arms may be pivotably supported via a first axle 311 on the body portion 310. A second axle 312 may pass between the outer ends of the rocker arms. The second axle 312 may protrude upwards from the upper rocker arm. The rocker arms may be spring loaded. The locking members 320, 330 are shown in an open position in the figure. The locking members 320, 330 turn into the locking position when there is tension in the first wire 350 passing to the first hoist H1. The outer ends of the locking members 320, 330 provided with the second axle 312 will thus turn towards each other so that the outer ends of the second axle 312 protrude into a respective hole 211, 212 in the second jointing clamp 200 attached to the end of the guide rail element 25.

The locking members 320, 330 will turn into the open position shown in the figure when the tension in the first wire 350 passing to the first hoist H1 is released. The hook 300 will fall downwards so that the outer ends of the second axle 312 of the locking members 320, 330 falls out from the respective holes 211, 212 in the second jointing clamp 200. The spring means will then push the locking members 320, 330 into the open position shown in the figure.

The hook device 300 may, when the locking members 320, 330 are in the open position, glide along the guide rail 25 downwards when the first hoist H1 unwinds the first wire 350 passing from the first hoist H1 to the hook 300. The weight of the hook device 300 will ensure that the hook device 300 glides downwards along the guide rail 25 when the first support wire 350 is unwounded from the first hoist H1.

Rollers 441, 442 may be used in connection with the first embodiment of the hook device 300 as shown in FIG. 4. The hook device 300 could be movably supported on the guide rail 25 with rollers. The hook device 300 could thus glide downwards on the row of already installed guide rail elements 25 when the transport apparatus 600 is moved downwards in order to fetch a new guide rail element 25.

FIG. 7 shows a second embodiment of a hook device of a transport apparatus.

The hook device 300A may comprise a first body part 360 and a second body part 370. The first body part 360 may be formed of two L-shaped brackets connected with a U-shaped hook 361. The two L-shaped brackets may be positioned on opposite sides of the support portion 25B of the guide rail element 25 so that the L-shaped brackets lean on a front surface of the bottom portion 25A of the guide rail 25. The second body part 370 may be formed of a substantially rectangular bracket positioned against a bottom surface of the bottom portion 25A of the guide rail element 25. The first body part 360 and the second body part 370 may be attached to each other with bolts and fly nuts 354. The bolts may pass through holes in the first body part 360 and in the second body part 370 so that the bolts become positioned on opposite sides of the guide rail 25. The guide rail element 25 becomes thus secured between the two body parts 360, 370 of the hook device 300A.

A connection plate 50 may be attached to the upper end of the guide rail 25. The connection plate 50 may have a rectangular shape provided with holes 51 for fastening bolts 55. The connection plate 50 may be positioned against the bottom of the bottom part 25A in the guide rail element 25. The connection plate 50 may be attached with bolts 55 to the bottom surface of the bottom part 25A of the guide rail element 25. An upper edge of the second body part 370 of the hook device 300A will lean against the lower end surface of the connection plate 50. The connection plate 50 prevents gliding of the hook device 300A upwards along the guide rail element 25 when the guide rail element 25 is lifted with the first wire 350 of the first hoist H1. A hook 355 is attached to the lower end of the first wire 350.

The hook device 300A may be disconnected from the guide rail element 25 by unwinding the fly nuts 354 from the bolts. This can be done from the installation platform 500 when the guide rail element 25 has been lifted to a correct position and the guide rail element 25 has been attached to a wall 21 of the shaft 20.

The jointing clamps 100, 200 used in connection with the first embodiment of the hook device 300 are not needed in connection with this second embodiment of the hook device 300A. The ends of the guide rail elements 25 are attached with the connection plates 50. The connection plate 50 forms also the support surface for the hook device 300A.

FIG. 8 shows a bracket.

The bracket 26 may be formed of two separate parts 26A, 26B that are movably connected to each other. A first part 26A of the bracket 26 may be attached to the guide rail 25 and a second part 26B of the bracket 26 may be attached to a wall 21 in the shaft 20. The first part 26A and the second part 26B may have the shape of a letter L with a vertical portion and a horizontal portion. The first part 26A of the bracket 26 may be attached from the vertical portion with a clamp 26C and a bolt 26D to the guide rail 25. The second part 26B of the bracket 26 may be attached from the vertical portion to the wall 21 in the shaft 20. The horizontal portions of the first part 26A and the second part 26B of the bracket 26 may be attached to each other with bolts passing through openings is said horizontal portions of the first 26A and the second 26B part of the bracket 26. The openings may be dimensioned so that it is possible to fine adjust the position of the first part 26A and the second part 26B of the bracket 26 in order to be able to align the guide rails 25.

The second part 26B of the bracket 26 may be attached to the wall in the shaft 20 with anchor bolts 26F. The vertical portion in the second part 26B of the bracket 26 may comprise oblong openings 26E being open at the lower end of the vertical portion in the second part 26B. Holes for the anchor bolts 26F may be drilled into the walls 21 of the shaft 20 at predetermined positions. Anchor bolts 26F may be screwed into the holes. The bolts 26F may be screwed only partly into the threading so that the head of the bolts 26F is at a distance from the fastening surface. The second part 26B of the bracket 26 may then be attached to the wall 21 of the shaft 20 before the guide rail 25 installation or during the guide rail 25 installation.

Tightening of the bolts 26F will attach the second part 26B of the bracket 26 to the wall 21 in the shaft 20. The bolts 26F may be tightened from the installation platform 500 manually by a technician or with a robot.

FIG. 9 shows an installation platform.

The installation platform 500 may comprise a bottom plane 510 and a roof plane 520 positioned at a vertical distance above the bottom plane 510. The bottom plane 510 may form a work surface for one or more technicians and/or for one or more robots and/or for tools. Vertical support bars 530 may extend between the bottom plane 510 and the roof plane 520. Two support rollers 540 may be provided at opposite ends in each plane 510, 520 in the installation platform 500. The support rollers 540 may support the installation platform 500 on opposite walls 21 in the shaft 20. The support rollers 540 may keep the installation platform 500 substantially in a horizontal plane when the installation platform 500 is moved upwards and downwards in the shaft 20. The installation platform 500 may further be provided with locking means for locking the installation platform 500 to the walls 21 in the shaft 20. The locking means could be realized with hydraulic cylinders acting against two opposite walls 21 in the shaft 20.

By-pass passages 550, 551 for guide rail elements 25 to be lifted during the installation of the guide rails 25 may further be formed in the installation platform 500. The by-pass passages 550, 551 may be formed of recesses protruding inwards from a perimeter of the installation platform 500. The by-pass passages 550, 551 may also provide space for the plumb lines PL1, PL2 to by-pass the installation platform 500.

The installation platform 500 may be provided with measuring devices MD10, MD11, MD12, MD13 for measuring the position of the installation platform 500 in relation to the shaft 20. The measuring devices MD10, MD11, MD12, MD13 may determine the position of the installation platform 500 in the shaft 20 based on the plumb lines PL1, PL2 once the installation platform 500 is locked in the shaft 20. The measuring devices MD10, MD11, MD12, MD13 can be based on a sensor measuring without contact the position of the plumb lines PL1, PL2 being formed of wires. Another possibility is to use light sources e.g. lasers on the bottom of the elevator shaft producing upwards directed light beams that can be measured with the measuring devices MD10, MD11, MD12, MD13 on the installation platform 500. The measuring devices MD10, MD11, MD12, MD13 could be light sensitive sensors or digital imaging devices measuring the hit points of the light beams produced by the light sources. The light source could be a robotic total station, whereby the measuring devices MD10, MD11, MD12, MD13 would be reflectors reflecting the light beams back to the robotic total station. The robotic total station would then measure the position of the measuring devices MD10, MD11, MD12, MD13.

The installation platform 500 may further be provided with distance measurement devises MD15, MD16 for measuring the vertical position i.e. the height position of the installation platform 500 in the shaft 20. The distance measurement may be based on a laser measurement.

FIG. 10 shows a lever device of a transport apparatus.

The lever device 400 may comprise a frame 410. The frame 410 may be have a general form of a parallelepiped. The frame 410 may be formed of support bars 411 forming the parallelepiped. The frame 410 may be movably supported via guide means 421, 422 on the guide rail 25. The guide means 421, 422 may comprise rollers or guiding shoes acting on the support surfaces of the guide rail 25. The lever device 400 may thus be movably supported on the row of already installed guide rail elements 25. The lever device 400 may roll or glide on the row of already installed guide rail elements 25. There may be two guide means 421, 422 positioned at a vertical distance from each other in the lever device 400. The lever device 400 may have a length in the vertical direction Z, a depth in a first horizontal direction X extending between the guide rails 25 and a width in a second horizontal direction Y extending from the back to the front in the shaft 20.

The lever device 400 may be supported on the hook device 300 with second wires 360A, 360B extending between the lever device 400 and the hook device 300. The lower ends of the second wires 360A, 360B may be attached to the frame 410 of the lever device 400 in lifting points P1, P2. The lifting points P1, P2 may be positioned in a centre of gravity in the horizontal direction of the lever device 400. The weight of the guide rail element 25 to be installed will be carried by the hook device 300. The lever device 400 is thus not affected by the weight of the guide rail element 25 to be installed. The upper ends of the second wires 360A, 360B may be attached to the hook device 300. Two second wires 360A, 360B may be used.

The lever device 400 may further comprise a holding device 430 movably supported in the lever device 400. The holding device 430 may be linearly movable in the lever device 400. The holding device 430 may receive a lower end of the guide rail element 25 to be lifted. The lower end of the guide rail element 25 to be lifted may be supported in the holding device 430. The lower end of the guide rail element 25 to be installed may be positioned in a nest arranged in the holding device 430. The upper end of the guide rail element 25 to be lifted is attached to the hook device 300, wherein the lower end of the guide rail element 25 to be lifted is kept in the nest in the holding device 430. The holding device 430 may be movably supported on guide bars 441, 442 attached to the frame 410 of the lever device 400. The guide bars 441, 442 may extend substantially in the horizontal direction X. The holding device 430 may thus be moved in the horizontal direction X along the guide bars 441, 442. The holding device 430 may be movable between a transport position and a mounting position. The holding device 430 is shown in the transport position in the figure. The holding device 430 may be positioned at a horizontal distance X1 from the row of already installed guide rail elements 25 in the transport position. The guide rail element 25 to be lifted, which is connected to the holding device 430, will thus also be positioned at a horizontal distance from the row of already installed guide rail elements 25.

The lever device 400 may comprise two guide bars 441, 442. The holding device 430 may be positioned between the two guide bars 441, 442. The holding device 430 may be movably supported with guide means on the guide bars 441, 442. The guide means may be formed of recesses in opposite outer edges of the holding device 430. Each recess may receive a respective guide bar 441, 442. The holding device 430 may thus glide on the guide bars 441, 442 when moving in the horizontal direction. The holding device 430 may be kept in the transport position by the friction between the guide means in the holding device 430 and the guide bars 441, 442.

The lever device 400 may further comprise an actuator in the form of a weight 470 movably supported in the lever device 400. The weight 470 may move linearly in the lever device 400. The weight 470 may be movably supported on guide rods 481, 482 attached to the frame 410 of the lever device 400. The guide rods 481, 482 may extend substantially in the vertical direction Z. The weight 470 may thus be moved in the vertical direction Z along the guide rods 471, 472. The guide rods 481, 482 may extend through openings in the weight 470. The weight 470 may thus glide along the guide rods 471, 472 when moving in the vertical direction. The weight 470 may move between an upper position and a lower position.

The holding device 430 may be operatively connected to the weight 470 via wires 461, 462 passing over rollers 451, 452, 453, 454. There may be two wires 461, 462 and four rollers 451, 452, 453, 454.

There may be two rollers 451, 452, 453, 454 in connection with each guide bar 441, 442. A first roller 451, 453 may be positioned in connection with an outer end of each guide bar 441, 442. A second roller 452, 454 may be positioned in connection with a longitudinal middle portion of each guide bar 441, 442 substantially vertically above the weight 470. The first roller 451, 453 at the outer end of each guide bar 441, 442 may be rotatably supported on the respective guide bar 441, 442 or on the frame 410 of the lever device 400. The second roller 453, 454 at the middle portion of the guide bar 441, 442 may be rotatably supported on the guide bar 441, 442 or on the frame 410 of the lever device 400.

A first wire 461 may run from the holding device 440 in a substantially horizontal direction X to the first roller 451, then over the first roller 451 and back in a substantially horizontal direction X to the second roller 452, then over the second roller 452, and finally in a substantially vertical direction to the weight 470.

A second wire 462 may run from the holding device 440 in a substantially horizontal direction X to the first roller 453, then over the first roller 453 and back in a substantially horizontal direction X to the second roller 454, then over the second roller 454, and finally in a substantially vertical direction to the weight 470.

A trigger device 475 may be arranged in connection with the weight 470 in the lever device 400. The trigger device 475 may keep the weight 470 locked to the frame 410 of the lever device 400 when the guide rail element 25 to be installed is lifted to the installation position in the shaft 20 with the transport apparatus 600 comprising the hook device 300 and the lever device 400. The weight 470 may be locked to the frame 410 of the lever device 400 in an upper position of the weight 470. The guide rail element 25 to be installed will thus be positioned at a distance from the row of already installed guide rail elements 25 on the lever device 400 when the trigger device 475 locks the weight 470 to the lever device 400. The holding device 430 is in the transport position when the guide rail element 25 to be installed is lifted. The trigger device 475 may unlock the weight 470 from the lever device 400 when the lever device 400 reaches the upper end of the row of already installed guide rail elements 25. The trigger device 475 may be formed e.g. of an articulated trigger member gliding on the guide rail 25. The articulated trigger member may rotate when the upper end of the row of already installed guide rail elements 25 is reached as there is no guide rail 25 to lean on.

Opening of the trigger device 475 will release the weight 470 so that the weight 470 starts to move from the upper position vertically downwards to a lower position along the guide rods 481, 482. The weight 470 moves linearly downwards due to gravity. When the weight 470 moves vertically downwards along the guide rods 481, 481, the holding device 430 moves horizontally to the left in the figure. The holding device 430 will move linearly from the transport position to a mounting position in which the lower end of the guide rail element 25 to be installed is positioned vertically above the upper end of the row of already installed guide rail elements 25. The lever device 400 may thereafter be moved downwards so that the lower end of the guide rail element 25 to be installed becomes connected to the upper end of the row of already installed guide rail elements 25.

The frame 410 of the lever device 400 forms a single unit. The holding device 430, the weight 470, the guide means 421, 422, and the trigger device 475 are all supported on the frame 410 of the lever device 400. The frame 410 of the lever device 400 may be stiff.

The opposite ends of the guide rail elements 25 may be attached to each other with the jointing clamps 100, 200. The jointing clamps 100, 200 may be attached to respective ends of the guide rail elements 25. The jointing clamps 100, 200 contribute to an automatic and fast connection of the opposite ends of the guide rail elements 25. The jointing clamp 200 connected to the upper end of the row of already installed guide rail elements 25 may be provided with male joint elements 210. The male joint elements 210 may be formed by pins. The jointing clamp 100 connected to the lower end of the guide rail element 100 to be installed may be provided with female joint elements 110. The female joint elements 110 may be formed of holes. The pins 210 protrude into the holes 110 when the guide rail element 25 to be installed is connected to the row of already installed guide rail elements 25. Another possibility is to use connection plates 50 to attach the opposite ends of the guide rail elements 25. A connection plate 50 may be attached to an upper end of each guide rail element 25. The following guide rail element 25 may be attached to the connection plate 50 and thereby to the uppermost guide element 25 in the row of already installed guide rail elements 25.

The lever device 400 could be made small and light. It would thus be possible to disconnect the lever device 400 from the row of already installed guide rail elements 25 in the loading position of the transport apparatus 600. The lever device 400 and the hook device 300 could thus be guided from the shaft 20 to a landing so that a new guide rail element 25 could be loaded on the transport apparatus 600 on the landing. The transport apparatus 600 carrying the new guide rail element 25 could then be guided back to the shaft 20. The lever device 400 could be guided and connected to the row of already installed guide rail elements 25 after which the new guide rail element 25 could be lifted with the transport apparatus 600 and the first hoist H1 to the installation position.

The figures show an embodiment in which the holding device 430 in the lever device 400 is moved with the weight 470. The weight 470 forms an actuator for moving the holding device 430. The actuator 470 is activated by the trigger device 475. This is an advantageous embodiment, but the holding device 430 may also be moved in other ways by other actuators. The holding device 430 could be moved e.g. by one or more coil springs and/or by one or more gas springs and/or by an electric actuator. The one or more coil springs and/or the one or more gas springs and/or the electric actuator may be activated by a trigger device in a similar manner as the weight 470. A battery could be provided in the lever device 430 if an electric actuator would be used to move the holding device 430.

The figures show an embodiment in which only one first hoist H1 with a transport apparatus 600 is used. The suspension point for the first hoist H1 would have to be changed during the installation. Each row of guide rail elements 25 to be installed would need a suspension point of their own for the first hoist H1. Several first hoists H1 could naturally be suspended from the ceiling of the shaft 20. Each first hoist H1 would thus be provided with a transport apparatus 600 of its own. This would mean that several rows of guide rail elements 25 could be installed simultaneously into the shaft 20.

The shaft 20 in the figures is intended for only one car 10, but the invention could naturally be used in shafts intended for several cars 10. Such elevator shafts 10 could be divided into sub-shafts for each car 10 with steel bars. Horizontal steel bars could be provided at predetermined intervals along the height of the shaft 20. A part of the guide rails 25 would then be attached to the steel bars in the shaft 20. Another part of the guide rails 25 would be attached to solid walls 21 in the shaft 20.

The invention may be used in low rise or in high rise buildings. The benefits of the invention are naturally greater in high rise buildings. High rise buildings may have a hoisting height over 75 meters, preferably over 100 meters, more preferably over 150 meters, most preferably over 250 meters.

The use of the invention is not limited to the elevator disclosed in the figures. The invention can be used in any type of elevator e.g. an elevator comprising a machine room or lacking a machine room, an elevator comprising a counterweight or lacking a counterweight. The counterweight could be positioned on either side wall or on both side walls or on the back wall of the elevator shaft. The drive, the motor, the traction sheave, and the machine brake could be positioned in a machine room or somewhere in the elevator shaft. The car guide rails could be positioned on opposite side walls of the shaft or on a back wall of the shaft in a so-called ruck-sack elevator.

It will be obvious to a person skilled in the art that, as the technology advances, the inventive concept can be implemented in various ways. The invention and its embodiments are not limited to the examples described above but may vary within the scope of the claims.

The invention claimed is:

1. A method for transporting elevator guide rails in a shaft, said method comprising moving a transport apparatus between a loading position and an installation position in the shaft with a first hoist, the transport apparatus comprising a hook device connected to the first hoist and a lever device connected to the hook device, the lever device being movably supported on guide rails, the lever device comprising a holding device being movably supported in the lever device, the holding device being linearly movable between a transport position and a mounting position in the lever device, moving the transport apparatus downwards to the loading position in the shaft, connecting a new guide rail element to the transport apparatus so that an upper end of the new guide rail element is connected to the hook device and a lower end of the new guide rail element is connected to the holding device, the holding device being in the transport position, and moving the transport apparatus carrying the new guide rail element upwards to the installation position in the shaft, the holding device being moved to the mounting position in which a lower end of the new guide rail element is connectable to an upper end of a row of already installed guide rail elements.

2. The method as claimed in claim 1, further comprising using an actuator to move the holding device between the transport position and the mounting position in the lever device.

3. The method as claimed in claim 2, further comprising using a weight as the actuator, the weight being movably supported in the lever device and operatively connected to the holding device so that the holding device moves in a horizontal direction between the transport position and the mounting position when the weight moves in a vertical direction between an upper position and a lower position.

4. The method as claimed in claim 3, further comprising using a trigger device to lock the weight to the lever device during lifting of the transport apparatus, and to release the weight when the lever device reaches the installation position so that the weight moves downwards from the upper position to the lower position, wherein the holding device moves from the transport position to the mounting position.

5. The method as claimed in claim 4, further comprising lowering the lever device downwards after the holding device has moved to the mounting position so that the new guide rail element is connectable to the row of already installed guide rail elements.

6. The method as claimed in claim 1, further comprising connecting consecutive guide rail elements to each other end-to-end via jointing clamps attached to opposite ends of each guide rail element to be connected.

7. The method as claimed in claim 1, further comprising connecting consecutive guide rail elements to each other end-to-end via a connection plate being attached to opposite ends of guide rail elements to be connected.

8. An arrangement for transporting elevator guide rails in a shaft, the arrangement comprising a transport apparatus being movable between a loading position and an installation position in a shaft with a first hoist, the transport apparatus comprising a hook device connected to the first hoist and a lever device connected to the hook device, the lever device being movably supported on guide rails, the lever device comprising a holding device being movably supported in the lever device, the holding device being linearly movable between a transport position and a mounting position in the lever device, wherein the transport apparatus is arranged to be moved downwards to the loading position in the shaft, a new guide rail element is arranged to be connected to the transport apparatus so that an upper end of the new guide rail element is connected to the hook device and a lower end of the new guide rail element is connected to the holding device, the holding device being in the transport position, and the transport apparatus carrying the new guide rail element is arranged to be moved upwards to the installation position in the shaft, the holding device being moved to the mounting position in which a lower end of the new guide rail element is connectable to an upper end of a row of already installed guide rail elements.

9. The arrangement as claimed in claim 8, wherein an actuator is arranged to move the holding device between the transport position and the mounting position in the lever device.

10. The arrangement as claimed in claim 9, wherein the actuator is formed by a weight movably supported in the lever device, the weight being operatively connected to the holding device so that the holding device moves in a horizontal direction between the transport position and the mounting position when the weight moves in a vertical direction between an upper position and a lower position.

11. The arrangement as claimed in claim 10, wherein a triggering device is arranged to lock the weight to the lever device during lifting of the transport apparatus, the triggering device releasing the weight when the lever device reaches the installation position so that the weight moves from the upper position to the lower position, wherein the holding device moves from the transport position to the mounting position.

12. The arrangement as claimed in claim 11, wherein the lever device is arranged to be lowered downwards after the holding device has moved to the mounting position so that the new guide rail element is connectable to the row of already installed guide rail elements.

13. The arrangement as claimed in claim 8, wherein consecutive guide rail elements are connected to each other end-to-end via jointing clamps attached to opposite ends of each guide rail element to be connected.

14. The arrangement as claimed in claim 8, wherein consecutive guide rail elements are connected to each other end-to-end via a connection plate being attached to opposite ends of the guide rail elements to be connected.

15. A transport apparatus for transporting elevator guide rail elements in a shaft, wherein the transport apparatus comprises:

a hook device configured to be detachably connectable to a first end of a guide rail element to be lifted; and a lever device connected to the hook device, the lever device being movably supported on guide rails of the shaft, the lever device comprising a holding device configured to be detachably connectable to a second end of the guide rail element to be lifted, the holding device being movably supported in a horizontal direction along guide bars of the lever device, the holding device being linearly movable between a transport position and a mounting position.

16. The transport apparatus as claimed in claim 15, wherein an actuator is arranged to move the holding device between the transport position and the mounting position in the lever device.

* * * * *